US012521965B2

United States Patent
Yee et al.

(10) Patent No.: US 12,521,965 B2
(45) Date of Patent: Jan. 13, 2026

(54) SEALED MULTILAYER STRUCTURES AND PACKAGES COMPRISING SEALED MULTILAYER STRUCTURES

(71) Applicants: Dow Global Technologies LLC, Midland, MI (US); Dow Chemical (Malaysia) Sdn. Bhd., Kuala Lumpur (MY)

(72) Inventors: Wu Aik Yee, Singapore (SG); Eng Kian Ma, Klang (MY); Hwee Lun Goh, Singapore (SG)

(73) Assignee: Dow Global Technologies LLC, Midland, MI (US)

( * ) Notice: Subject to any disclaimer, the term of this patent is extended or adjusted under 35 U.S.C. 154(b) by 558 days.

(21) Appl. No.: 17/295,720

(22) PCT Filed: Dec. 16, 2019

(86) PCT No.: PCT/US2019/066649
§ 371 (c)(1),
(2) Date: May 20, 2021

(87) PCT Pub. No.: WO2020/139611
PCT Pub. Date: Jul. 2, 2020

(65) Prior Publication Data
US 2022/0002048 A1 Jan. 6, 2022

(30) Foreign Application Priority Data
Dec. 24, 2018 (WO) ............... PCT/MY2018/050097

(51) Int. Cl.
B32B 7/12 (2006.01)
B32B 27/08 (2006.01)
B32B 27/32 (2006.01)
B32B 27/34 (2006.01)

(52) U.S. Cl.
CPC .............. *B32B 7/12* (2013.01); *B32B 27/08* (2013.01); *B32B 27/32* (2013.01); *B32B 27/34* (2013.01); *B32B 2250/05* (2013.01); *B32B 2250/24* (2013.01); *B32B 2307/31* (2013.01); *B32B 2307/516* (2013.01); *B32B 2307/72* (2013.01); *B32B 2307/732* (2013.01); *B32B 2439/46* (2013.01); *B32B 2439/70* (2013.01)

(58) Field of Classification Search
CPC .......... B32B 7/12; B32B 27/08; B32B 27/32; B32B 27/34; B32B 2250/05; B32B 2250/24; B32B 2307/31; B32B 2307/516; B32B 2307/72; B32B 2307/732; B32B 2307/748; B32B 2439/70; B32B 2307/54; B32B 2307/558; B32B 2307/5825; B32B 2439/00; B32B 2439/46; B32B 27/18; B32B 27/20; B32B 27/26; B32B 27/306; B32B 27/308
See application file for complete search history.

(56) References Cited

U.S. PATENT DOCUMENTS

| | | | |
|---|---|---|---|
| 3,697,368 A | 10/1972 | Bhuta et al. | |
| 3,791,915 A | 2/1974 | Goehring et al. | |
| 3,908,070 A | 9/1975 | Marzolf | |
| 3,988,499 A * | 10/1976 | Reynolds | .......... B29C 66/91218 |
| | | | 426/127 |
| 4,095,012 A | 6/1978 | Schirmer | |
| 4,215,176 A | 7/1980 | Tuller et al. | |
| 4,230,830 A | 10/1980 | Tanny et al. | |
| 4,233,367 A | 11/1980 | Ticknor et al. | |
| 4,301,216 A | 11/1981 | Grant | |
| 4,311,742 A * | 1/1982 | Otsuka | .................... B32B 27/32 |
| | | | 428/483 |
| 4,477,407 A | 10/1984 | Hetherington et al. | |
| 4,501,798 A | 2/1985 | Koschak et al. | |
| 4,503,102 A | 3/1985 | Mollison | |
| 4,640,852 A | 2/1987 | Ossian | |
| 4,661,303 A | 4/1987 | Chum et al. | |
| 4,661,395 A | 4/1987 | Akao | |
| 4,687,688 A | 8/1987 | Curie et al. | |
| 4,724,185 A | 2/1988 | Shah | |
| 4,746,562 A | 5/1988 | Fant | |

(Continued)

FOREIGN PATENT DOCUMENTS

EP 0236099 A2 9/1987
EP 0344373 A1 12/1989
(Continued)

OTHER PUBLICATIONS

Translation of JP H05-200956 (Year: 1993).*
Notice of Reasons for Refusal. Japanese Patent Application No. 2021-535259. Dated Oct. 31, 2023. (Year: 2023).*
Hosokawa Alpine Brochure—Process Technologies for Tomorrow.
Borealis AG—PO Blown Film Solutions for Flexible Packaging brochure.
Patel, Polymer Engineering and Science, 1994, vol. 34. No. 19.
Krishnaswamy, Polymer, 2000, vol. 41, p. 9205-9217.
(Continued)

*Primary Examiner* — John D Freeman
(74) *Attorney, Agent, or Firm* — Jacob R. Graham

(57) ABSTRACT

Embodiments of the present invention relate to sealed multilayer structures, packages formed therefrom, and methods of forming packages. In one aspect, a sealed multilayer structure comprises: (a) a uniaxially oriented multilayer film having a first oriented film thickness, wherein the film is oriented in the machine direction at a draw ratio greater than 1:1 and less than 4:1, and (b) a second multilayer film comprising a sealant layer and having a second film thickness, wherein the sealant layer of the first oriented film is sealed to the sealant layer of the second film, and wherein the total thickness of the sealed films is at least 5 percent greater than the sum of the first oriented film thickness and the second film thickness.

12 Claims, No Drawings

(56) References Cited

U.S. PATENT DOCUMENTS

| | | | |
|---|---|---|---|
| 4,818,592 A | 4/1989 | Ossian | |
| 4,937,112 A | 6/1990 | Schirmer | |
| 5,004,647 A | 4/1991 | Shah | |
| 5,077,109 A | 12/1991 | Lustig et al. | |
| 5,094,799 A | 3/1992 | Takashige et al. | |
| 5,298,326 A | 3/1994 | Norpoth et al. | |
| RE35,285 E | 6/1996 | Quacquarella et al. | |
| 5,885,721 A | 3/1999 | Su et al. | |
| 6,068,933 A | 5/2000 | Shepard et al. | |
| 6,221,470 B1 | 4/2001 | Ciocca et al. | |
| 6,391,411 B1 | 5/2002 | Duckwall, Jr. et al. | |
| 6,479,137 B1 | 11/2002 | Joyner et al. | |
| 6,613,841 B2 | 9/2003 | Williams | |
| 7,794,848 B2 | 9/2010 | Breese | |
| 8,741,433 B2 | 6/2014 | Schell et al. | |
| 8,802,802 B2 | 8/2014 | Breese | |
| 2002/0107124 A1* | 8/2002 | Colla | B31B 70/00 493/11 |
| 2004/0173491 A1 | 9/2004 | Buelow et al. | |
| 2004/0209021 A1 | 10/2004 | Shih | |
| 2005/0200046 A1 | 9/2005 | Breese | |
| 2006/0228503 A1 | 10/2006 | Havens et al. | |
| 2008/0299370 A1 | 12/2008 | Briggs | |
| 2010/0015423 A1 | 1/2010 | Schaefer et al. | |
| 2010/0151218 A1 | 6/2010 | Curie et al. | |
| 2010/0297371 A1 | 11/2010 | Mitani et al. | |
| 2018/0134012 A1 | 5/2018 | Barreneche | |

FOREIGN PATENT DOCUMENTS

| | | | |
|---|---|---|---|
| EP | 2875948 A1 | | 5/2015 |
| EP | 2653392 B1 | | 10/2015 |
| EP | 2944466 A1 | | 11/2015 |
| JP | 05200956 A | * | 8/1993 |
| WO | 1998006574 A1 | | 2/1998 |
| WO | 2014/026949 A1 | | 2/2014 |
| WO | 2015052246 A1 | | 4/2015 |
| WO | 2017003773 A1 | | 1/2017 |
| WO | 2018005577 A1 | | 1/2018 |

OTHER PUBLICATIONS

NS Packaging, https://www.nspackaging.com/news/company-news/borealis-launches-low-density-polyethylene-for-flexible-packaging-converters/.

PCT/MY2018/050097, International Search Report and Written Opinion with a mailing date of Jul. 31, 2019.

PCT/MY2018/050097, International Preliminary Report on Patentability with a mailing date of Jul. 8, 2021.

PCT/US2019/066649, International Search Report and Written Opinion with a mailing date of Mar. 31, 2020.

PCT/US2019/066649, International Preliminary Report on Patentability with a mailing date of Jul. 8, 2021.

* cited by examiner

SEALED MULTILAYER STRUCTURES AND PACKAGES COMPRISING SEALED MULTILAYER STRUCTURES

FIELD

This disclosure relates to sealed multilayer structures, to packages comprising such sealed multilayer structures, and to methods of forming a package.

INTRODUCTION

In many food packaging applications, particularly those where toughness and/or oxygen barrier is required, polyamide films or polyamide layers are utilized. For example, polyamide films are sometimes laminated to a polyethylene film using a laminating adhesive. As another example, a polyamide layer is coextruded with polyethylene using a tie layer to form a multilayer film via blown film extrusion or cast film extrusion. These approaches increase the overall toughness of the film for use in a flexible package.

The durability of the flexible package (e.g., the ability to survive drops from certain heights, prevention of leaks, etc.) also depends on the seal strength of the films that are sealed together to form the flexible package. A high seal strength can assist in preventing leakage and reducing drop failures, which will likewise reduce food or product waste. However, as polyethylene has a typical seal strength of around 30N at thinner gauges, the seal strength may not be adequate for applications that require higher toughness.

It would be desirable to have new sealable multilayer structures and packages that can provide high toughness as well as high seal strengths.

SUMMARY

The present invention provides sealed multilayer structures that have a desirable toughness and improved seal strength. In particular, the sealed multilayer structures incorporate multilayer films that have been oriented in the machine direction within a specified draw ratio which unexpectedly provide high seal strengths when heat sealed to another multilayer film. In addition, some embodiments of the inventive sealed multilayer structures advantageously provide improvement in optics and/or machine direction tear resistance, as well as the potential for downgauging.

In one aspect, the present invention provides a sealed multilayer structure that comprises (a) a uniaxially oriented multilayer film having a first oriented film thickness, the first oriented film comprising:

(1) a first layer comprising polyamide;
(2) a sealant layer comprising at least one polyethylene having a density from 0.865 g/cm³ to 0.965 g/cm³ and a melt index ($I_2$) from 0.1 to 10 g/10 minutes; and
(3) a tie layer in adhering contact with the first layer and the sealant layer, wherein the film is oriented in the machine direction at a draw ratio greater than 1:1 and less than 4:1, and (b) a second multilayer film comprising a sealant layer and having a second film thickness, wherein the sealant layer of the first oriented film is sealed to the sealant layer of the second film, and wherein the total thickness of the sealed films is at least 5 percent greater than the sum of the first oriented film thickness and the second film thickness.

As discussed below, the present invention also provides packages formed from the inventive sealed multilayer structures disclosed herein, as well as methods of forming packages.

These and other embodiments are described in more detail in the Detailed Description.

DETAILED DESCRIPTION

Unless stated to the contrary, implicit from the context, or customary in the art, all parts and percents are based on weight, all temperatures are in ° C., and all test methods are current as of the filing date of this disclosure.

The term "composition," as used herein, refers to a mixture of materials which comprises the composition, as well as reaction products and decomposition products formed from the materials of the composition.

"Polymer" means a polymeric compound prepared by polymerizing monomers, whether of the same or a different type. The generic term polymer thus embraces the term homopolymer (employed to refer to polymers prepared from only one type of monomer, with the understanding that trace amounts of impurities can be incorporated into the polymer structure), and the term interpolymer as defined hereinafter. Trace amounts of impurities (for example, catalyst residues) may be incorporated into and/or within the polymer. A polymer may be a single polymer, a polymer blend or a polymer mixture, including mixtures of polymers that are formed in situ during polymerization.

The term "interpolymer," as used herein, refers to polymers prepared by the polymerization of at least two different types of monomers. The generic term interpolymer thus includes copolymers (employed to refer to polymers prepared from two different types of monomers), and polymers prepared from more than two different types of monomers.

The terms "olefin-based polymer" or "polyolefin", as used herein, refer to a polymer that comprises, in polymerized form, a majority amount of olefin monomer, for example ethylene or propylene (based on the weight of the polymer), and optionally may comprise one or more comonomers.

The term, "ethylene/α-olefin interpolymer," as used herein, refers to an interpolymer that comprises, in polymerized form, a majority amount (>50 mol %) of units derived from ethylene monomer, and the remaining units derived from one or more α-olefins. Typical α-olefins used in forming ethylene/α-olefin interpolymers are $C_3$-$C_{10}$ alkenes.

The term, "ethylene/α-olefin copolymer," as used herein, refers to a copolymer that comprises, in polymerized form, a majority amount (>50 mol %) of ethylene monomer, and an α-olefin, as the only two monomer types.

The term "α-olefin", as used herein, refers to an alkene having a double bond at the primary or alpha (α) position.

"Polyethylene" or "ethylene-based polymer" shall mean polymers comprising a majority amount (>50 mol %) of units which have been derived from ethylene monomer. This includes polyethylene homopolymers or copolymers (meaning units derived from two or more comonomers). Common forms of polyethylene known in the art include Low Density Polyethylene (LDPE); Linear Low Density Polyethylene (LLDPE); Ultra Low Density Polyethylene (ULDPE); Very Low Density Polyethylene (VLDPE); single-site catalyzed Linear Low Density Polyethylene, including both linear and substantially linear low density resins (m-LLDPE); Medium Density Polyethylene (MDPE); and High Density Polyethylene (HDPE). These polyethylene materials are generally known in the art; however, the following descriptions may be helpful in understanding the differences between some of these different polyethylene resins.

The term "LDPE" may also be referred to as "high pressure ethylene polymer" or "highly branched polyethylene" and is defined to mean that the polymer is partly or entirely homo-polymerized or copolymerized in autoclave or tubular reactors at pressures above 14,500 psi (100 MPa) with the use of free-radical initiators, such as peroxides (see for example U.S. Pat. No. 4,599,392, which is hereby incorporated by reference). LDPE resins typically have a density in the range of 0.916 to 0.935 g/cm$^3$.

The term "LLDPE", includes both resin made using the traditional Ziegler-Natta catalyst systems and chromium-based catalyst systems as well as single-site catalysts, including, but not limited to, bis-metallocene catalysts (sometimes referred to as "m-LLDPE") and constrained geometry catalysts, and includes linear, substantially linear or heterogeneous polyethylene copolymers or homopolymers. LLDPEs contain less long chain branching than LDPEs and includes the substantially linear ethylene polymers which are further defined in U.S. Pat. Nos. 5,272,236, 5,278,272, 5,582,923 and 5,733,155; the homogeneously branched linear ethylene polymer compositions such as those in U.S. Pat. No. 3,645,992; the heterogeneously branched ethylene polymers such as those prepared according to the process disclosed in U.S. Pat. No. 4,076,698; and/or blends thereof (such as those disclosed in U.S. Pat. No. 3,914,342 or 5,854,045). The LLDPEs can be made via gas-phase, solution-phase or slurry polymerization or any combination thereof, using any type of reactor or reactor configuration known in the art.

The term "MDPE" refers to polyethylenes having densities from 0.926 to 0.935 g/cm$^3$. "MDPE" is typically made using chromium or Ziegler-Natta catalysts or using single-site catalysts including, but not limited to, bis-metallocene catalysts and constrained geometry catalysts, and typically have a molecular weight distribution ("MWD") greater than 2.5.

The term "HDPE" refers to polyethylenes having densities greater than about 0.935 g/cm$^3$ and up to about 0.970 g/cm$^3$, which are generally prepared with Ziegler-Natta catalysts, chrome catalysts or single-site catalysts including, but not limited to, bis-metallocene catalysts and constrained geometry catalysts.

The term "ULDPE" refers to polyethylenes having densities of 0.880 to 0.912 g/cm$^3$, which are generally prepared with Ziegler-Natta catalysts, chrome catalysts, or single-site catalysts including, but not limited to, bis-metallocene catalysts and constrained geometry catalysts.

"Blend", "polymer blend" and like terms mean a composition of two or more polymers. Such a blend may or may not be miscible. Such a blend may or may not be phase separated. Such a blend may or may not contain one or more domain configurations, as determined from transmission electron spectroscopy, light scattering, x-ray scattering, and any other method known in the art. Blends are not laminates, but one or more layers of a laminate may contain a blend. Such blends can be prepared as dry blends, formed in situ (e.g., in a reactor), melt blends, or using other techniques known to those of skill in the art.

The term "in adhering contact" and like terms mean that one facial surface of one layer and one facial surface of another layer are in touching and binding contact to one another such that one layer cannot be removed from the other layer without damage to the interlayer surfaces (i.e., the in-contact facial surfaces) of both layers.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure not specifically delineated or listed.

In one aspect, the present invention provides a sealed multilayer structure that comprises (a) a uniaxially oriented multilayer film having a first oriented film thickness, the first oriented film comprising:

(1) a first layer comprising polyamide;
(2) a sealant layer comprising at least one polyethylene having a density from 0.865 g/cm$^3$ to 0.965 g/cm$^3$ and a melt index ($I_2$) from 0.1 to 10 g/10 minutes; and
(3) a tie layer in adhering contact with the first layer and the sealant layer, wherein the film is oriented in the machine direction at a draw ratio greater than 1:1 and less than 4:1, and (b) a second multilayer film comprising a sealant layer and having a second film thickness, wherein the sealant layer of the first oriented film is sealed to the sealant layer of the second film, and wherein the total thickness of the sealed films is at least 5 percent greater than the sum of the first oriented film thickness and the second film thickness. In some embodiments, the first tie layer in the first multilayer film comprises maleic anhydride grafted polyethylene.

In some embodiments, the first oriented film further comprises a second tie layer in adhering contact with the first layer on an opposite side of the first layer from the first tie layer. In some embodiments where the first oriented film comprises such a second tie layer, the first oriented film further comprises a second layer in adhering contact with the second tie layer on an opposite side of the second tie layer from the first layer, wherein the second layer comprises at least one polyethylene having a density from 0.865 to 0.965 g/cm$^3$ and a melt index ($I_2$) from 0.1 to 10 g/10 minutes. In other embodiments where the first oriented film comprises such a second tie layer, the first oriented film further comprises a second layer in adhering contact with the second tie layer on an opposite of the second tie layer from the first layer, wherein the second layer comprises polyamide. In some embodiments, the first and second tie layers in the first multilayer film each comprise maleic anhydride grafted polyethylene.

In some embodiments, the first oriented film comprises up to 13 layers. The first oriented film comprises three layers in some embodiments. The first oriented film comprises five layers in some embodiments.

In some embodiments, the second multilayer film is a uniaxially oriented multilayer film. In some embodiments, the first oriented film and the second multilayer film have the same structure. The second multilayer film, in some embodiments, is uniaxially oriented and comprises (1) a first layer comprising polyamide; (2) a sealant layer comprising at least one polyethylene having a density from 0.865 g/cm$^3$ to 0.965 g/cm$^3$ and a melt index ($I_2$) from 0.1 to 10 g/10 minutes; and (3) a tie layer in adhering contact with the first layer and the sealant layer, wherein the film is oriented in the machine direction at a draw ratio greater than 1:1 and less than 4:1. In some embodiments, the first tie layer in the second multilayer film comprises maleic anhydride grafted polyethylene.

In some embodiments, the seal strength of the first oriented film to the second multilayer film is at least 1.5 times greater than the seal strength of two unoriented films having the same film structures and thicknesses as the first oriented film and the second multilayer film.

A sealed multilayer structure of the present invention can comprise a combination of two or more embodiments as described herein.

Embodiments of the present invention also relate to articles such as packages. In some embodiments, a package of the present invention comprises any of the sealed multilayer structures disclosed herein. A package of the present invention can comprise a combination of two or more embodiments as described herein.

Embodiments of the present invention also relate to methods of forming packages. In one embodiment, a method of forming a package comprises (a) coextruding a first multilayer film comprising:
 (1) a first layer comprising polyamide;
 (2) a sealant layer comprising at least one polyethylene having a density from 0.865 g/cm³ to 0.965 g/cm³ and a melt index ($I_2$) from 0.1 to 10 g/10 minutes; and
 (3) a tie layer in adhering contact with the first layer and the sealant layer;
 (b) orienting the first multilayer film in the machine direction at a draw ratio greater than 1:1 and less than 4:1 to provide a first oriented film having a first oriented film thickness;
 (c) coextruding a second multilayer film comprising:
 (1) a first layer comprising polyamide;
 (2) a sealant layer comprising at least one polyethylene having a density from 0.865 g/cm³ to 0.965 g/cm³ and a melt index ($I_2$) from 0.1 to 10 g/10 minutes; and
 (3) a tie layer in adhering contact with the first layer and the sealant layer;
 (d) orienting the second multilayer film in the machine direction at a draw ratio greater than 1:1 and less than 4:1 to provide a second oriented film having a second oriented film thickness; and
 (e) heat sealing at least a portion of the sealant layer of the first oriented film to at least a portion of the sealant layer of the second oriented film to form a package, wherein the total thickness of the sealed films is at least 5 percent greater of the sum of the first oriented film thickness and the second oriented film thickness. A method of forming a package of the present invention can comprise a combination of two or more embodiments as described herein.

Uniaxially Oriented Multilayer Film

The sealed multilayer structure of the present invention comprises a first uniaxially oriented multilayer film have a first oriented film thickness. The multilayer film includes at least three layers: (1) a first layer comprising polyamide; (2) a sealant layer comprising at least one polyethylene having a density from 0.865 g/cm³ to 0.965 g/cm³ and a melt index (I2) from 0.1 to 10 g/10 minutes; and (3) a tie layer in adhering contact with the first layer and the sealant layer. These layers are discussed in further detail below.

First Layer

In describing a first layer of the uniaxially oriented multilayer film, it should be understood that the term "first" is used to identify the layer within the context of the other layers in the film. Nonetheless, in some embodiments, the first layer is an outer layer of the film.

The first layer of the uniaxially oriented multilayer film comprises polyamide. The polyamide in the first layer can provide barrier properties to the film. Examples of polyamides that can be used in the first layer include polyamide 6, polyamide 9, polyamide 10, polyamide 11, polyamide 12, polyamide 6,6, polyamide 6/66 and aromatic polyamide such as polyamide 61, polyamide 6T, MXD6, or combinations thereof, which are commercially available from a variety of sources.

Sealant Layer

The uniaxially oriented multilayer film further comprises a sealant layer. The sealant layer includes a sealing composition capable of sealing the multilayer film to another multilayer film. For example, in some embodiments, the sealing composition may be a heat sealing composition. In some embodiments, the sealing composition may be capable of hermitically sealing the multilayer film to another film. In some embodiments, the sealant layer comprises at least one polyethylene having a density from 0.865 g/cm³ to 0.965 g/cm³ and a melt index ($I_2$) from 0.1 to 10 g/10 minutes.

The sealant layer can comprise a variety of polyethylenes and blends of polyethylenes in various embodiments including, for example, LDPE, LLDPE, ULDPE, VLDPE, m-LLDPE, MDPE, HDPE, enhanced polyethylene, polyolefin plastomers, polyolefin elastomers, and combinations thereof. Persons of ordinary skill in the art can identify appropriate compositions for the sealant layer based on the teachings herein.

In some embodiments, the one or more polyethylenes used in the sealant layer have a density of 0.865 to 0.965 g/cm³. All individual values and subranges from 0.865 to 0.965 g/cm³ are included and disclosed herein; for example the density of the polyethylene can be from 0.890 to 0.935 g/cm³, or in the alternative, from 0.895 to 0.930 g/cm³, or in the alternative, from 0.900 to 0.930 g/cm³.

In some embodiments, the at least one polyethylene used in the sealant layer has a melt index ($I_2$) of 0.1 to 10 g/10 minutes. All individual values and subranges from 0.1 to 10 g/10 minutes are included herein and disclosed herein. For example, the at least one polyethylene can have a melt index from a lower limit of 0.1, 0.2, 0.25, 0.5, 0.75, 1, 2, 4, or 5 g/10 minutes to an upper limit of 1, 2, 4, 5, or 10 g/10 minutes. The at least one polyethylene has a melt index ($I_2$) of from 0.1 to 2.5 g/10 minutes in some embodiments. In some embodiments, the at least one polyethylene has a melt index ($I_2$) from 0.1 to 2 g/10 minutes, or from 0.1 to 1.0 g/10 minutes.

In some embodiments, the sealant layer comprises at least one LLDPE. Examples of commercially available LLDPE that can be used in embodiments of the present invention include DOWLEX™ 2045G, DOWLEX™ 2045.11G, DOWLEX™ 2645G, DOWLEX 2645.11G, DOWLEX 2047G, DOWLEX™ 2607G, DOWLEX™ 2606G, DOWLEX™ 2049G, DOWLEX™ 2098G, as well as other linear low density polyethylenes, which are commercially available from The Dow Chemical Company.

In some embodiments, the sealant layer comprises at least one enhanced polyethylene having a density between 0.900 and 0.930 g/cm³. Examples of commercially available enhanced polyethylene that can be used in embodiments of the present invention include ELITE™ and ELITE™ AT enhanced polyethylenes are commercially available from The Dow Chemical Company, such as ELITE™ AT 6201, ELITE™ AT 6410, ELITE™ 5400G, and others.

In some embodiments, the sealant layer comprises at least one polyolefin plastomer having a density between 0.865 and 0.915 g/cm³. Examples of commercially available polyolefin plastomers that can be used in embodiments of the present invention include AFFINITY™ PL1880G, AFFINITY™ PL1881G, AFFINITY™ PL1840G, as well as other AFFINITY™ polyolefin plastomers, which are commercially available from The Dow Chemical Company.

In some embodiments, the sealant layer can further comprise polar polymers such as maleic anhydride grafted polyethylene and/or ethylene vinyl acetate.

Blends of the aforementioned polymers can be used in the sealant layer according to some embodiments of the present invention. Examples of maleic anhydride grafted polyethylenes that can be used in the sealant layer in some embodiments of the present invention include AMPLIFY™ TY 1052H, AMPLIFY™ TY 1053H, AMPLIFY™ TY 1054H, AMPLIFY™ TY 1151, AMPLIFY™ TY 1451, AMPLIFY™ TY 1351, as well as other AMPLIFY™ TY Functional Polymers, which are commercially available from The Dow Chemical Company. Examples of ethylene vinyl acetate that can be used in some embodiments of the present invention include Elvax 670, Elvax 660, Elvax 770, Elvax 560, Elvax 470, Elvax 360, Elvax 265, Elvax 760 as well as other Elvax ethylene vinyl acetates, which are commercially available from DuPont.

In some embodiments, the sealant layer can also comprise blends of the aforementioned polymers with LDPE. In some embodiments, the sealant layer can comprise a blend of LDPE and ethylene vinyl acetate or an ionomer of a copolymer comprising ethylene and at least one of acrylic acid and methacrylic acid. Examples of commercially available LDPE that can be used in some embodiments of the present invention include DOW™ LDPE 150E, DOW™ LDPE 310E, DOW™ LDPE 312E, DOW™ LDPE 320E, DOW™ LDPE 352E, DOW™ LDPE 450E, and DOW™ LDPE 582E, from the Dow Chemical Company. Examples of ethylene vinyl acetate that can be used in some embodiments of the present invention include any of the Elvax ethylene vinyl acetates listed in the preceding paragraph, as well as other Elvax ethylene vinyl acetates, which are commercially available from DuPont. Examples of commercially available ionomers that can be used in some embodiments of the present invention include those commercially available from DuPont under the name Surlyn.

Tie Layer

The uniaxially oriented multilayer film further includes a tie layer in adhering contact with the first layer and the sealant layer. The tie layer can be any tie layer known to those of ordinary skill in the art to be suitable for use in adhering different layers in a multilayer film based on the teachings herein. In connection with the present application, tie layers known to suitable for adhering a polyamide layer and a layer comprising polyolefins could be used.

For example, the tie layer can comprise a maleic anhydride grafted polymer comprising ethylene monomer. Examples of commercially available maleic anhydride grafted polymers comprising ethylene monomer that can be used in some embodiments include AMPLIFY™ TY 1451, AMPLIFY™ TY 1053H, AMPLIFY™ TY 1057H, AMPLIFY™ TY 1052H, and AMPLIFY™ TY 1151, each of which are available from The Dow Chemical Company; BYNEL 41E710, BYNEL 4033, BYNEL 4140, FUSABOND E Series functionalized ethylene-based modifiers and M Series random ethylene copolymers available from DuPont; and OREVAC 0E825 from Arkema.

Examples of maleic anhydride grafted polymers comprising ethylene monomer that can be used in tie layer include maleic anhydride grafted polyethylene, maleic anhydride grafted ethylene acrylate, maleic anhydride grafted ethylene vinyl acetate, and combinations thereof.

In some embodiments, the tie layer further comprises at least one additional polymer in addition to a maleic anhydride grafted polymer. Examples of polymers that can be in the tie layer, in addition to maleic anhydride grafted polymer comprising ethylene monomer, include ethylene alkyl acrylate copolymers (e.g., AMPLIFY EA from The Dow Chemical Company, ELVALOY AC from DuPont, and LOTRYL from Arkema), ethylene vinyl acetate copolymers, elastomeric ethylene/α-olefin copolymers including octene or hexene or butene or propylene (e.g., ENGAGE polyolefin elastomers and AFFINITY polyolefin plastomers from The Dow Chemical Company, and Queo plastomers from Borealis), propylene based copolymers with ethylene (e.g., VERSIFY plastomers and elastomers which are commercially available from The Dow Chemical Company), ethylene-based olefin block copolymers (e.g., INFUSE olefin block copolymers commercially available from The Dow Chemical Company), and crystalline block composite (as defined below), and combinations thereof. For example, an ethylene alkyl acrylate copolymer can be ethylene methyl acrylate, ethylene ethyl acrylate, ethylene butyl acrylate, or combinations thereof. Examples of blends of maleic anhydride grafted polymers comprising ethylene monomer and of ethylene alkyl acrylate copolymers that can be used as a tie layer in some embodiments of the present invention are set forth in PCT Publication No. WO2014/035483.

In one embodiment, the tie layer comprises a blend of 10-50% of a maleic anhydride grafted polyethylene, having a maleic anhydride concentration of 0.1 and 2.0%, and 50-90% ethylene alkyl acrylate copolymer (e.g., ethylene ethyl acrylate copolymer, et al.). In another embodiment, the tie layer comprises a blend of 10-50% of a maleic anhydride grafted polyethylene, having a maleic anhydride concentration of 0.1-2.0%, and 50-90% ethylene vinyl acetate copolymer.

In some embodiments, instead of, or in addition to, a maleic anhydride grafted polymer comprising ethylene monomer, the tie layer can comprise acrylic acid-modified polymers comprising ethylene monomer, acetate-modified polymers comprising ethylene monomer, acrylate-modified polymers comprising ethylene monomer, or combinations thereof. Examples of commercially available acrylic acid-modified polymers comprising ethylene monomer that can be used in some embodiments include those commercially available from DuPont under the name Nucrel and those commercially available from Exxon Mobil Corporation under the name Escor such as Escor 5000, Escor 5020, Escor 5050, Escor 5080, Escor 5100, and Escor 6000. Examples of commercially available acetate-modified polymers comprising ethylene monomer that can be used in some embodiments include those commercially available from Dupont such as Fusabond C and A series, like Fusabond C250 and Fusabond A560. Examples of commercially available acrylate-modified polymers comprising ethylene monomer that can be used in some embodiments include those commercially available from Dupont such as Evaloy AC which can be ethylene butyl-, ethyl-, and methyl-acrylates.

In addition to one or more maleic anhydride grafted polymers comprising ethylene monomer, acrylic acid-modified polymers comprising ethylene monomer, acetate-modified polymers comprising ethylene monomer, and acrylate-modified polymers comprising ethylene monomer, the tie layer, in some embodiments, can further comprise one or more of the additional polymers discussed above (e.g., ethylene alkyl acrylate copolymers, ethylene vinyl acetate copolymers, elastomeric ethylene/α-olefin copolymers including octene or hexene or butene or propylene, propylene based copolymers with ethylene, ethylene-based olefin block copolymers, and crystalline block composite, and combinations thereof.

Other Layers

In some embodiments, the uniaxially oriented multilayer film can include other layers in addition to the first layer (polyamide layer), the tie layer, and the sealant layer. In such embodiments, the sealant layer would be an outermost layer of the film (prior to sealing). The number of layers in uniaxially oriented multilayer films for use in sealed multilayer structures of the present invention can depend on a number of factors including, for example, the desired properties of the film, the desired properties of the sealed multilayer structures, the end use application for the sealed multilayer structures, the desired polymers to be used in each layer, the desired thickness of the film, and others. For example, the uniaxially oriented multilayer film can further comprise other layers typically included in multilayer films depending on the application including, for example, barrier layers, other tie layers, polyethylene layers, polypropylene layers, etc.

Uniaxially oriented multilayer films comprise at least three layers in some embodiments. In some embodiments, the uniaxially oriented multilayer film comprises up to 13 layers. In various embodiments, the uniaxially oriented multilayer film comprises 3, 4, 5, 6, 7, 8, 9, 10, 11, 12, or 13 layers.

For example, in some embodiments, the multilayer film further comprises a second tie layer in adhering contact with the first layer (the layer with polyamide) on an opposite side of the first layer from the first tie layer. In a further embodiment, the multilayer film further comprises another layer in adhering contact with the second tie layer on an opposite side of the second tie layer from the first layer, wherein this layer comprises at least one polyethylene having a density from 0.865 to 0.965 g/cm$^3$ and a melt index ($I_2$) from 0.1 to 10 g/10 minutes.

Additives

It should be understood that any of the foregoing layers can further comprise one or more additives as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents.

A variety of uniaxially oriented multilayer films can be formed in accordance with the teachings of the present invention. The multilayer films can have particularly desirable properties when oriented only in the machine direction and used in sealed multilayer structures according to the present invention.

A multilayer film to be uniaxially oriented in the machine direction can be formed according to any method known to those of ordinary skill in the art. For example, such multilayer films can be coextruded as blown films or cast films using techniques known to those of ordinary skill in the art. In some embodiments, the multilayer films are blown films.

Prior to orientation, the multilayer films can have a thickness of up to 250 microns in some embodiments. In some embodiments, the multilayer films have a thickness of 200 microns or less prior to orientation.

Once formed, multilayer films are then oriented in the machine direction only so as to provide uniaxially oriented multilayer films for use in sealed multilayer structures of the present invention. The multilayer film can be oriented in the machine direction only using techniques known to those of ordinary skill in the art. According to embodiments of the present invention, the multilayer film is oriented in the machine direction at a draw ratio greater than 1:1 and less than 4:1. By orienting the multilayer film within this draw ratio range, the uniaxially oriented multilayer film exhibits unexpectedly high seal strengths when heat sealed to another multilayer film, as well as other improvements in some embodiments as discussed further herein.

Second Multilayer Film

In addition to the first uniaxially oriented multilayer film, sealed multilayer structures of the present invention further comprise a second multilayer film having a second film thickness. The second multilayer film comprises a sealant layer and at least one additional layer.

Sealant Layer

The sealant layer in the second multilayer film can be any of the sealant layers disclosed above in connection with the first uniaxially oriented multilayer film. In some embodiments, the sealant layer of the second multilayer film has the same composition as the sealant layer of the first uniaxially oriented multilayer film.

Other Layers

The second multilayer film includes at least one layer in addition to the sealant layer. The number of layers in the second multilayer film for use in sealed multilayer structures of the present invention can depend on a number of factors including, for example, the desired properties of the film, the desired properties of the sealed multilayer structures, the end use application for the sealed multilayer structures, the desired polymers to be used in each layer, the desired thickness of the film, and others. For example, the second multilayer films can further comprise other layers typically included in multilayer films depending on the application including, for example, barrier layers, tie layers, polyethylene layers, polypropylene layers, etc. The second multilayer film can comprise at least two layers in some embodiments. The second multilayer film can comprise at least three layers in some embodiments. In some embodiments, the second multilayer film comprises up to 13 layers. In various embodiments, the second multilayer film comprises 3, 4, 5, 6, 7, 8, 9, 10, 11, 12, or 13 layers.

In some embodiments, the second multilayer film further comprises, in addition to the sealant layer, a layer comprising polyamide, and a tie layer in adhering contact with the layer comprising polyamide and the sealant layer. For example, in some embodiments, the second multilayer film comprises a first layer comprising polyamide, (2) a sealant layer comprising at least one polyethylene having a density from 0.865 g/cm$^3$ to 0.960 g/cm$^3$ and a melt index ($I_2$) from 0.1 to 10 g/10 minutes, and (3) a tie layer in adhering contact with the first layer and the sealant layer. In such embodiments, the first layer comprising polyamide and the tie layer can comprise any of the layer compositions described above in connection with the first uniaxially oriented multilayer film. Further, as discussed below, in some embodiments, the second multilayer film can also be uniaxially oriented.

In some embodiments comprising a polyamide layer, a tie layer, and a sealant layer, the second multilayer film can include other layers. In such embodiments, the sealant layer would be an outermost layer of the film (prior to sealing). For example, in some embodiments, the second multilayer film further comprises a second tie layer in adhering contact with the first layer (the layer with polyamide) on an opposite side of the first layer from the first tie layer. In a further embodiment, the second multilayer film further comprises another layer in adhering contact with the second tie layer on an opposite side of the second tie layer from the first layer, wherein this layer comprises at least one polyethylene having a density from 0.865 to 0.965 g/cm$^3$ and a melt index ($I_2$) from 0.1 to 10 g/10 minutes.

In some embodiments, the second multilayer film is composed of the same layers having the same compositions (i.e., has the same structure) as the uniaxially oriented multilayer film.

Additives

It should be understood that any of the foregoing layers of the second multilayer film can further comprise one or more additives as known to those of skill in the art such as, for example, antioxidants, ultraviolet light stabilizers, thermal stabilizers, slip agents, antiblock, pigments or colorants, processing aids, crosslinking catalysts, flame retardants, fillers and foaming agents.

In some further embodiments, the second multilayer film can be uniaxially oriented. The second multilayer film can have particularly desirable properties when oriented only in the machine direction and used in sealed multilayer structures with the other uniaxially oriented multilayer film according to the present invention.

A second multilayer film to be uniaxially oriented in the machine direction can be formed according to any method known to those of ordinary skill in the art. For example, such multilayer films can be coextruded as blown films or cast films using techniques known to those of ordinary skill in the art. In some embodiments, the second multilayer films are blown films.

Prior to orientation, the second multilayer films can have a thickness of up to 250 microns in some embodiments. In some embodiments, the multilayer films have a thickness of 200 microns or less prior to orientation.

Once formed, the second multilayer film can be oriented in the machine direction only, in some embodiments so as to provide as a second uniaxially oriented multilayer film for use in sealed multilayer structures of the present invention. The second multilayer film can be oriented in the machine direction only using techniques known to those of ordinary skill in the art. According to embodiments of the present invention, the second multilayer film is oriented in the machine direction at a draw ratio greater than 1:1 and less than 4:1. By orienting the multilayer film within this draw ratio range, the second uniaxially oriented multilayer film exhibits unexpectedly high seal strengths when heat sealed to first uniaxially oriented multilayer film, as well as other improvements in some embodiments as discussed further herein.

Sealed Multilayer Structures and Packages

A sealed multilayer structure of the present invention comprises a first uniaxially oriented film (as described above) sealed to the second multilayer film (as described above including, for example, embodiments where the second multilayer film is also uniaxially oriented). In particular, the sealant layer of the first uniaxially oriented film is sealed to the sealant layer of the second multilayer film.

The first uniaxially oriented film can be sealed to the second multilayer film using heat sealing techniques known to those of the skilled in the art. For example, the sealed multilayer structure can be formed when making a package. Packages utilizing multilayer structures of the present invention can advantageously be formed with heat seal packaging equipment utilizing continuously heated seal bars, in some embodiments. The sealant layers of the two films are placed in contact with each other and the heated seal bars apply heat that is transferred through the other layers to the sealant layers which then adhere to one another. The thermal resistance properties of the outer layers of the uniaxially oriented multilayer film and the second multilayer film help protect the film structure during formation of the package with the continuously heated seal bars. Examples of such packaging equipment utilizing continuously heated seal bars include horizontal form-fill-seal machines and vertical form-fill-seal machines. Examples of sealed multilayer structures (e.g., packages) that can be formed from such equipment include stand-up pouches, 4-corner packages (pillow pouches), fin seal packages and others.

According to embodiments of the present invention, one phenomenon observed when the first uniaxially oriented film is sealed to the second multilayer film is that the total thickness of the sealed multilayer structure is greater than sum of the first oriented film thickness and the second film thickness (including, for example, embodiments where the second multilayer film is also uniaxially oriented). In some embodiments, the total thickness of the sealed multilayer structure is at least 5 percent greater than the sum of the first oriented film thickness and the second film thickness. The total thickness of the sealed multilayer structure is at least 8 percent greater than the sum of the first oriented film thickness and the second film thickness, in some embodiments. In other embodiments, the total thickness of the sealed multilayer structure is at least 9 percent, at least 10 percent, or at least 12 percent greater than the sum of the first oriented film thickness and the second film thickness. The total thickness of the sealed multilayer structure is up 20 percent greater than the sum of the first oriented film thickness and the second film thickness in some embodiments. In some embodiments, the total thickness of the sealed multilayer structure is up to 18 percent greater than the sum of the first oriented film thickness and the second film thickness.

This increase in thickness of the sealed multilayer structure is believed to also advantageously provide an increase in seal strength. In some embodiments, the seal strength of the first oriented film to the second multilayer film is at least 1.5 times greater than the seal strength of two unoriented films having the same film structures and thicknesses as the first oriented film and the second multilayer film. In some embodiments, the seal strength of the first oriented film to the second multilayer film is up to 3 times greater than the seal strength of two unoriented films having the same film structures and thicknesses as the first oriented film and the second multilayer film.

As previously noted, the second multilayer film can also be uniaxially oriented. In some embodiments, both the first uniaxially oriented multilayer film and the second uniaxially oriented multilayer film are oriented in the machine direction at a draw ratio greater than 1:1 and less than 4:1. In some such embodiments, the seal strength of the first oriented film to the second oriented film is at least 1.5 times greater than the seal strength of two unoriented films having the same film structures and thicknesses as the first oriented film and the second oriented film. In some embodiments, the seal strength of the first oriented film to the second oriented film is up to 3 times greater than the seal strength of two unoriented films having the same film structures and thicknesses as the first oriented film and the second oriented film.

Embodiments of the present invention also comprise packages formed from or incorporate a sealed multilayer structure of the present invention. Such packages can be formed from any of the sealed multilayer structures described herein.

Examples of such packages can include flexible packages, pouches, stand-up pouches, and pre-made packages or pouches. In some embodiments, sealed multilayer structures of the present invention can be used for food packages. Examples of food that can be included in such packages include meats, cheeses, cereal, nuts, juices, sauces, and others. Such packages can be formed using techniques known to those of skill in the art based on the teachings herein and based on the particular use for the package (e.g., type of food, amount of food, etc.).

Methods of Forming Packages

Some embodiments of the present invention related to methods of forming packages. In one embodiments, a method of forming a package comprises:

(a) coextruding a first multilayer film comprising:
   (1) a first layer comprising polyamide;
   (2) a sealant layer comprising at least one polyethylene having a density from 0.865 g/cm³ to 0.960 g/cm³ and a melt index ($I_2$) from 0.1 to 10 g/10 minutes; and
   (3) a tie layer in adhering contact with the first layer and the sealant layer;
(b) orienting the first multilayer film in the machine direction at a draw ratio greater than 1:1 and less than 4:1 to provide a first oriented film having a first oriented film thickness;
(c) coextruding a second multilayer film comprising:
   (1) a first layer comprising polyamide;
   (2) a sealant layer comprising at least one polyethylene having a density from 0.865 g/cm³ to 0.960 g/cm³ and a melt index (12) from 0.1 to 10 g/10 minutes; and
   (3) a tie layer in adhering contact with the first layer and the sealant layer;
(d) orienting the second multilayer film in the machine direction at a draw ratio greater than 1:1 and less than 4:1 to provide a second oriented film having a second oriented film thickness; and
(e) heat sealing at least a portion of the sealant layer of the first oriented film to at least a portion of the sealant layer of the second oriented film to form a package, wherein the total thickness of the sealed films is at least 5 percent greater of the sum of the first oriented film thickness and the second oriented film thickness. The compositions and structures of the first multilayer film and of the second multilayer film can be any of those disclosed herein.

Test Methods

Unless otherwise indicated herein, the following analytical methods are used in describing aspects of the present invention:

Density

Samples for density measurement are prepared according to ASTM D 1928. Polymer samples are pressed at 190° C. and 30,000 psi (207 MPa) for three minutes, and then at 21° C. and 207 MPa for one minute. Measurements are made within one hour of sample pressing using ASTM D792, Method B.

Melt Index

Melt indices 12 (or 12) and $I_{10}$ (or I10) are measured in accordance with ASTM D-1238 at 190° C. and at 2.16 kg and 10 kg load, respectively. Their values are reported in g/10 min. "Melt flow rate" is used for polypropylene based resins and determined according to ASTM D1238 (230° C. at 2.16 kg).

Heat Seal Strength

Heat seal strength, or seal strength is measured using ASTM F2029-00 as follows. The film sample, which can be any thickness, is sealed to itself at different temperatures at a pressure of 0.27 MPa and a 0.5 second dwell time (films of thicknesses greater than 100 micron are sealed with a 1 second dwell time). The samples are conditioned for 24 hours and then cut into 25 mm strips which are then pulled on a Zwick tensile testing device at a rate of 500 mm/min. 5 replicate test samples are measured, and the average is recorded. The failure mechanism is also observed (cohesive failure vs. delamination).

Tensile Strength

Tensile strength is measured in accordance with ASTM D882.

Secant Modulus

Secant modulus at 1% strain and at 2% strain are measured in the machine direction (MD) and cross direction (CD) with a Zwick Universal tester according to ASTM D882-12.

Elmendorf Tear Resistance

Elmendorf Tear Resistance is measured in machine direction (MD) and transverse direction (TD) in accordance with ASTM D1922.

Puncture Resistance

Puncture is measured using a modified version of ASTM D5748-95. The samples are conditioned for 24 hours and then cut into 150 mm by 150 mm film samples which are then pulled on a Zwick tensile testing device. The film is punctured with a modified puncture probe at a rate of 250 mm/min. 5 replicate test samples are measured, and the average is recorded.

Some embodiments of the invention will now be described in detail in the following Examples.

EXAMPLES

For the Examples, a three-layer (A/B/C) coextruded film and a five-layer (A/B/CAVD) coextruded film are prepared as follows.

The three-layer film (Film 1) has the following structure (A/B/C=Polyamide/Tie Layer/Polyethylene):

TABLE 1

| Layer | Material (Supplier) | Thickness Ratio | Density (g/cm³) | $I_2$ (g/10 minutes) |
|---|---|---|---|---|
| Polyamide | Ultramid B40 L polyamide 6 (BASF) | 40% | 1.12 | — |
| Tie Layer | AMPLIFY ™ TY 1451 maleic anhydride grafted polyethylene (The Dow Chemical Company) | 14% | 0.910 | 1.7 |
| Polyethylene | ELITE ™ AT 6201 enhanced polyethylene (The Dow Chemical Company) | 46% | 0.907 | 0.85 |

Five different five-layer films have the following structures (A/B/C/B/D=Polyethylene 1/Tie Layer/Polyamide/Tie Layer/Polyethylene 2):

TABLE 2

| Layer | Material (Supplier) | Thickness Ratio | Density (g/cm$^3$) | $I_2$ (g/10 minutes) |
|---|---|---|---|---|
| Polyamide | Ultramid B40 L polyamide 6 (BASF) | 20% | 1.12 | — |
| Tie Layer | AMPLIFY ™ TY 1451 maleic anhydride grafted polyethylene (The Dow Chemical Company) | 28% (14% per tie layer) | 0.910 | 1.7 |
| Polyethylene 1 | ELITE ™ 5960G enhanced polyethylene (The Dow Chemical Company) | 20% | 0.962 | 0.85 |
| Polyethylene 2 | as specified in Table 3 below | 32% | | |

TABLE 3

| Example | Polyethylene 1 Material (Supplier) | Density (g/cm$^3$) | $I_2$ (g/10 minutes) |
|---|---|---|---|
| Film 2 | ELITE ™ AT 6201 enhanced polyethylene (The Dow Chemical Company) | 0.907 | 0.85 |
| Film 3 | ELITE ™ AT 6410 enhanced polyethylene (The Dow Chemical Company) | 0.912 | 0.85 |
| Film 4 | DOWLEX ™ 2045G linear low density polyethylene (The Dow Chemical Company) | 0.920 | 1.0 |
| Film 5 | ELITE ™ 5400G enhanced polyethylene (The Dow Chemical Company) | 0.916 | 1.0 |
| Film 6 | AFFINITY ™ PL 1880G polyolefin plastomer (The Dow Chemical Company) | 0.902 | 1.0 |

A fifth five-layer film (Film 7) has the following structure (A/B/C/B/D=Polyethylene 1/Tie Layer/Polyamide/Tie Layer/Polyethylene 2):

TABLE 4

| Layer | Material (Supplier) | Thickness Ratio | Density (g/cm$^3$) | $I_2$ (g/10 minutes) |
|---|---|---|---|---|
| Polyamide | Ultramid B40 L polyamide 6 (BASF) | 20% | 1.12 | — |
| Tie Layer | AMPLIFY ™ TY 1052H maleic anhydride grafted polyethylene (15% by weight) and DOWLEX ™ 2045G linear low density polyethylene (85% by weight) (The Dow Chemical Company) | 28% (14% per tie layer) | 0.913 (average) | 1.04 (average) |
| Polyethylene 1 | ELITE ™ 5960G enhanced polyethylene (The Dow Chemical Company) | 20% | 0.962 | 0.85 |
| Polyethylene 2 | ELITE ™ AT 6201 enhanced polyethylene (The Dow Chemical Company) | 32% | 0.907 | 0.85 |

The thickness ratios for the layers in the above structures are provided because the films are cast at 50 microns, 100 microns, 150 microns, and 200 microns, with the 100 micron, 150 micron, and 200 micron films being oriented in the machine direction at draw ratios of 2:1, 3:1, and 4:1, respectively, to provide machine direction oriented films having a thickness of 50 microns.

The films are produced using a Dr. Collin 5 layer coextrusion cast film line. The line was comprised of four 25:1 L/D single screw extruders, equipped with grooved feed zones. For the three layer film (Film 1), only three of the four extruders are used. Screw diameters are 25 mm for the two outer layers (Layers A (Polyamide) and D (Polyethylene)) extruders and 30 mm for the inner layer extruder (Layer C (Tie Layer)). For the five layer films (Films 2-6), four extruders are used. Screw diameters are 25 mm for extruders A, B, D and 30 mm for extruder C. The slot die gap is 0.7 millimeters. The maximum line speed is 30 meters/minute with a maximum output for LLDPE of 25 kg/hour. Gravimetric feeders are also used. The following temperature profile is used in the extruders:

TABLE 5

| Extruder Zone | Extruder A | Extruder B | Extruder C | Extruder D |
|---|---|---|---|---|
| Zone 1 (Temp, ° C.) | 240 | 190 | 190 | 190 |
| Zone 2 (Temp, ° C.) | 275 | 230 | 230 | 230 |
| Zone 3 (Temp, ° C.) | 280 | 240 | 240 | 240 |
| Zone 4 (Temp, ° C.) | 285 | 250 | 250 | 250 |

Samples of Films 1-6 are cast at multiple thicknesses: 50 microns, 100 microns, 150 microns, and 200 microns and will be designated herein by Film # (Thickness) (e.g., Film 1(50), Film 1(100), Film 1(150), Film 1 (200), Film 2(50), Film 2(100), etc.).

After each film is cast (with the exception of the 50 micron films), it is oriented in the machine direction to a thickness of 50 microns using a Dr. Collin MDO-II set-up. The film is passed over heated rollers in eight different temperature zones (as shown in Table 6 below), where the sealant layer (Polyethylene Layer in Film 1, and Polyethylene 2 Layer in Films 2-7) does not contact the heated rollers.

TABLE 6

| MDO Zone | Temperature (° C.) |
|---|---|
| D1 | 90 |
| D2 | 100 |
| D3 | 110 |
| D4 | 90 |
| D5 | 60 |
| D6 | 40 |
| D7 | 25 |
| D8 | 25 |

Heat Seal Strength

The heat seal strengths of the films are measured as described above in the Test Methods section and the results are discussed below. Each film is sealed to itself in accordance with the specified Test Method.

The heat seal strengths of Film 1 are measured and shown in Table 7.

TABLE 7

| Film | Amount of MD Orientation | Seal Strengths (N) | | | |
|---|---|---|---|---|---|
| | | 100° C. | 110° C. | 120° C. | 130° C. |
| Film 1(50) | | 26.48 | 36.48 | 32.09 | 34.65 |
| Film 1(100) | 2X | 2.64 | 42.17 | 66.01 | 67.45 |
| Film 1(150) | 3X | 1.64 | 48.87 | 91.26 | 87.73 |
| Film 1(200) | 4X | 27.90 | 33.71 | 31.38 | 35.68 |

For Film 1, the seal strengths increase with increasing orientation before decreasing again at an MDO of 4×. Film 1(100) and Film 1(150) represent inventive examples according to some embodiments. Similar results are observed for the five layer films as discussed below.

The heat seal strengths of Film 2 are measured and shown in Table 8.

TABLE 8

| Film | Amount of MD Orientation | Seal Strengths (N) | | | | |
|---|---|---|---|---|---|---|
| | | 90° C. | 100° C. | 110° C. | 120° C. | 130° C. |
| Film 2(50) | | 9.06 | 22.76 | 29.42 | 28.92 | 27.78 |
| Film 2(100) | 2X | 0.17 | 6.54 | 44.31 | 53.72 | 50.92 |
| Film 2(150) | 3X | 0.81 | 7.11 | 51.36 | 76.09 | 82.91 |
| Film 2(200) | 4X | 0.16 | 9.84 | 56.42 | 69.94 | 73.56 |

For Film 2, the seal strengths increase with increasing orientation before decreasing again at an MDO of 4×. Film 2(100) and Film 2(150) represent inventive examples according to some embodiments.

The heat seal strengths of Film 3 are measured and shown in Table 9.

TABLE 9

| Film | Amount of MD Orientation | Seal Strengths (N) | | | | | |
|---|---|---|---|---|---|---|---|
| | | 100° C. | 110° C. | 120° C. | 130° C. | 140° C. | 150° C. |
| Film 3(50) | | 18.24 | 33.46 | 32.93 | 32.74 | 31.73 | 31.79 |
| Film 3(100) | 2X | 0.32 | 27.13 | 62.4 | — | — | — |
| Film 3(150) | 3X | 4.41 | 53.07 | 66.96 | 74.71 | 75.62 | 70.02 |
| Film 4(200) | 4X | 0.77 | 39.04 | 35.35 | 67.68 | — | — |

For Film 3, a maximum seal strength is achieved at a MDO of 3×. Film 3(100) and Film 3(150) represent inventive examples according to some embodiments.

The heat seal strengths of Film 4 are measured and shown in Table 10.

TABLE 10

| Film | Amount of MD Orientation | Seal Strengths (N) | | | |
|---|---|---|---|---|---|
| | | 100° C. | 110° C. | 120° C. | 130° C. |
| Film 4(50) | | 3.01 | 25.28 | 31.50 | — |
| Film 4(100) | 2X | 0.22 | 0.716 | 65.31 | — |
| Film 4(150) | 3X | 0.15 | 0.31 | 62.15 | — |
| Film 4(200) | 4X | 0.14 | 0.33 | 72.93 | 71.35 |

For Film 4 using linear low density polyethylene as the sealant layer, a maximum seal strength is achieved at a MDO of 4×. Film 4(100), Film 4(150), and Film 4(200) represent inventive examples according to some embodiments.

The heat seal strengths of Film 5 are measured and shown in Table 11.

TABLE 11

| Film | Amount of MD Orientation | Seal Strengths (N) | | | |
|---|---|---|---|---|---|
| | | 100° C. | 110° C. | 120° C. | 130° C. |
| Film 5(50) | | 17.54 | 23.73 | 28.89 | — |
| Film 5(100) | 2X | 0.36 | 3.45 | 69.69 | — |
| Film 5(150) | 3X | 0.26 | 3.21 | 59.75 | 74.10 |
| Film 5(200) | 4X | — | — | — | — |

For Film 5, the seal strengths increase with increasing orientation, but Film 5 could not be stretched beyond an MDO of 3×. Film 5(100) and Film 5(150) represent inventive examples according to some embodiments.

The heat seal strengths of Film 6 are measured and shown in Table 12.

TABLE 12

| Film | Amount of MD Orientation | Seal Strengths (N) | | | | | |
|---|---|---|---|---|---|---|---|
| | | 80° C. | 90° C. | 100° C. | 110° C. | 120° C. | 130° C. |
| Film 6(50) | | 0.58 | 19.31 | 27.25 | 30.38 | 26.66 | 29.78 |
| Film 6(100) | 2X | 0.22 | 8.34 | 44.72 | 56.59 | 68.54 | — |
| Film 6(150) | 3X | 0.16 | 6.22 | 45.98 | 52.40 | 66.00 | — |
| Film 6(200) | 4X | 0.14 | 5.46 | 53.04 | 72.47 | 59.53 | 57.72 |

For Film 6, the seal strengths increase with increasing orientation. Film 6(100), Film 6(150), and Film 6(200) represent inventive examples according to some embodiments.

The heat seal strengths of Film 7, which utilizes different tie layers, are measured and shown in Table 13.

TABLE 13

| Film | Amount of MD Orientation | Seal Strengths (N) | | | | | | |
|---|---|---|---|---|---|---|---|---|
| | | 90° C. | 100° C. | 110° C. | 120° C. | 130° C. | 140° C. | 150° C. |
| Film 7(50) | | 0.38 | 22.68 | 31.96 | 32.10 | — | — | — |
| Film 7(150) | 3X | 0.19 | 9.30 | 66.58 | 81.13 | 86.77 | 82.66 | 88.04 |

For Film 7, the seal strengths also increase with when oriented in the machine direction at 3×. Film 7(100) represents an inventive example according to some embodiments.

Mechanical Properties

Certain mechanical properties of the three layer film and one of the five layer films are also measured in accordance with the Test Methods as described above.

The Elmendorf tear resistances of Film 1 and Film 2 are measured in machine direction (MD) and transverse direction (TD). The results are shown in Tables 14 and 15, respectively.

TABLE 14

| Film | Amount of MD Orientation | MD Tear Resistance (N) | TD Tear Resistance (N) |
|---|---|---|---|
| Film 1(50) | | 2.57 | 5.87 |
| Film 1(100) | 2X | 2.94 | 1.73 |
| Film 1(150) | 3X | 3.53 | 1.72 |
| Film 1(200) | 4X | 3.69 | 0.85 |

TABLE 15

| Film | Amount of MD Orientation | MD Tear Resistance (N) | TD Tear Resistance (N) |
|---|---|---|---|
| Film 2(50) | | 1.75 | 3.23 |
| Film 2(100) | 2X | 3.07 | 1.61 |
| Film 2(150) | 3X | 5.24 | 1.10 |
| Film 2(200) | 4X | 4.09 | 0.94 |

Tables 14 and 15 show an increase in Elmendorf tear resistance in the machine direction with increasing orientation in the machine direction. Elmendorf tear resistance in the transverse direction decreases with increasing orientation.

The tensile strengths and moduli of Film 1 and Film 2 are measured in machine direction (MD) and transverse direction (TD). The results are shown in Tables 16 and 17, respectively.

TABLE 16

| Film | Amount of MD Orientation | MD Tensile (MPa) | TD Tensile (MPa) | MD Modulus (MPa) | TD Modulus (MPa) |
|---|---|---|---|---|---|
| Film 1(50) |  | 30.8 | 37.9 | 243 | 193 |
| Film 1(100) | 2X | 76.3 | 33 | 342 | 322 |
| Film 1(150) | 3X | 94.3 | 31.3 | 399 | 387 |
| Film 1(200) | 4X | 95.7 | 29.6 | 423 | 641 |

TABLE 17

| Film | Amount of MD Orientation | MD Tensile (MPa) | TD Tensile (MPa) | MD Modulus (MPa) | TD Modulus (MPa) |
|---|---|---|---|---|---|
| Film 2(50) |  | 39.2 | 36.2 | 310 | 186 |
| Film 2(100) | 2X | 58.6 | 32.9 | 370 | 348 |
| Film 2(150) | 3X | 82 | 31.6 | 574 | 470 |
| Film 2(200) | 4X | 127 | 29.7 | 1020 | 645 |

Tables 16 and 17 show increases in tensile strengths in the machine direction as well as increases in modulus values in both directions with increasing orientation in the machine direction.

The puncture resistances of Film 1 and Film 2 are also measured. The results are shown in Tables 18 and 19, respectively.

TABLE 18

| Film | Amount of MD Orientation | Puncture Force (N) | Puncture Energy (J) |
|---|---|---|---|
| Film 1(50) |  | 72.96 | 2.56 |
| Film 1(100) | 2X | 98.07 | 2.85 |
| Film 1(150) | 3X | 93.71 | 1.37 |
| Film 1(200) | 4X | 111.34 | 1.09 |

TABLE 19

| Film | Amount of MD Orientation | Puncture Force (N) | Puncture Energy (J) |
|---|---|---|---|
| Film 2(50) |  | 45.73 | 1.98 |
| Film 2(100) | 2X | 75.88 | 1.91 |
| Film 2(150) | 3X | 63.83 | 0.78 |
| Film 2(200) | 4X | 84.37 | 0.86 |

Tables 18 and 19 show an increase in the force required to puncture the film with increasing orientation. The puncture energy also tends to decrease with increasing orientation.

Thickness of Sealed Films

As noted above, an increase in seal strength is observed with orientation in the machine direction, particularly at draw ratios of up to around 3x. Certain sealed films are analyzed and an increase in thickness of the sealed sealant layers are observed with the oriented films. The specified film is sealed to itself at 0.275 MPa and at a temperature of 130° C. for 0.5 seconds. The sealed film is analyzed under a Leica Optical Microscope (Model: DMLM/P) equipped with a digital camera (Model: Leica 300) to measure the thickness of the layers in the sealed film. The film sample is clamped on a modified holder before a microtome blade is used to cut the film cross-sectionally and observed under the optical microscope.

The control (unoriented) version of Film 2 (Film 2(50) and the version that is oriented at a draw ratio of 3x (Film 2(150)) are compared and the thicknesses measured. For Film 2(150), with the machine direction orientation of 3x, the thickness of the sealed region (the region where the sealant layer of the first film contacts the sealant layer of the second film) is 31.78 microns, whereas the thickness of that region in the unoriented version of Film 2 is 17.43 microns. Without wishing to be bound by theory, it is believed that the orientation in the machine direction increases the heat resistance, which results in less seal thinning as compared to an unoriented sample.

The overall thicknesses of the versions of Film 5 and Film 6 that were oriented in the machine direction at a draw ratio of 3x (Film 5(150) and Film 6(150)) are also compared before and after sealing. The unsealed films have a nominal thickness of 100 microns (two 50 micron films being sealed together). After sealing, the sealed Film 5 (150) samples have a total thickness of 109 microns. After sealing, the sealed Film 6 (150) samples have a total thickness of 109 microns. This is consistent with the above observation that the thickness of the sealant layers increase after the sealing of such machine direction oriented multilayer films. Such sealed multilayer structures are further examples of some embodiments of the present invention.

That which is claimed:

1. A sealed multilayer structure comprising:
    (a) a first uniaxially oriented multilayer film having a first oriented film thickness, the first oriented film comprising:
        (1) a first layer comprising polyamide;
        (2) a sealant layer comprising at least one polyethylene having a density from 0.865 g/cm$^3$ to 0.965 g/cm$^3$ and a melt index (I2) from 0.1 to 10 g/10 minutes; and
        (3) a first tie layer in adhering contact with the first layer and the sealant layer, wherein the film is oriented in the machine direction at a draw ratio greater than 1:1 and less than 4:1, and
    (b) a second multilayer film comprising a sealant layer and having a second film thickness;
    wherein the sealant layer of the first oriented film is sealed to the sealant layer of the second film, and wherein the total thickness of the sealed films is at least 5 percent greater than the sum of the first oriented film thickness and the second film thickness; wherein the sealant layer of the first oriented film is sealed to the sealant layer of the second film at 90° C. to 150° C.; and wherein the first tie layer comprises a maleic anhydride grafted polyethylene having a density of less than 0.930 g/cm$^3$, a melt index (I2) of less than 2.0 g/10 mins, and a maleic anhydride concentration of 0.1 to 2.0%; wherein the seal strength of the first oriented film to the second multilayer film is at least 1.5 times greater than the seal strength of two unoriented films having the same film structures and thicknesses as the first oriented film and the second multilayer film.

2. The sealed multilayer structure of claim 1, wherein the second multilayer film is uniaxially oriented and comprises:
    (1) a first layer comprising polyamide;
    (2) a sealant layer comprising at least one polyethylene having a density from 0.865 g/cm$^3$ to 0.965 g/cm$^3$ and a melt index (I2) from 0.1 to 10 g/10 minutes; and (3) a tie layer in adhering contact with the first layer and the sealant layer,
    wherein the film is oriented in the machine direction at a draw ratio greater than 1:1 and less than 4:1.

3. The sealed multilayer structure of claim 1, wherein the first oriented film further comprises a second tie layer in adhering contact with the first layer on an opposite side of the first layer from the first tie layer.

4. The sealed multilayer structure of claim 1, wherein the first oriented film further comprises a second layer in adhering contact with the second tie layer on an opposite side of the second tie layer from the first layer, wherein the second layer comprises at least one polyethylene having a density from 0.865 to 0.965 g/cm$^3$ and a melt index (I2) from 0.1 to 10 g/10 minutes.

5. The sealed multilayer structure of claim 1, wherein the first oriented film further comprises a second layer in adhering contact with the second tie layer on an opposite of the second tie layer from the first layer, wherein the second layer comprises polyamide.

6. The sealed multilayer structure of claim 1, wherein the first uniaxially oriented film comprises up to 13 layers.

7. The sealed multilayer structure of claim 1, wherein the first oriented film and the second multilayer film have the same structure.

8. A package comprising the sealed multilayer structure of claim 1.

9. The sealed multilayer structure of claim 1, wherein the first tie layer comprises a blend of 10-50% of the maleic anhydride grafter polyethylene and 50-90% ethylene vinyl acetate copolymer.

10. The sealed multilayer structure of claim 1, wherein the sealant layer comprises at least one polyolefin plastomers having a density between 0.865 and 0.915 g/cm$^3$.

11. The sealed multilayer structure of claim 1, wherein the sealant layer of the second multilayer films has a composition different than the sealant layer of the first oriented film.

12. The sealed multilayer structure of claim 1, wherein the second multilayer structure comprises less layers than the first oriented film.

* * * * *